(12) United States Patent
Veerasamy et al.

(10) Patent No.: US 12,377,496 B2
(45) Date of Patent: *Aug. 5, 2025

(54) TECHNIQUES FOR LASER ABLATION/SCRIBING OF COATINGS IN PRE- AND POST-ASSEMBLED INSULATED GLASS UNITS, AND/OR ASSOCIATED METHODS

(71) Applicant: GUARDIAN GLASS, LLC, Auburn Hills, MI (US)

(72) Inventors: Vijayen S. Veerasamy, Ann Arbor, MI (US); Robert A. Vandal, Syracuse, IN (US)

(73) Assignee: Guardian Glass, LLC

( * ) Notice: Subject to any disclaimer, the term of this patent is extended or adjusted under 35 U.S.C. 154(b) by 909 days.

This patent is subject to a terminal disclaimer.

(21) Appl. No.: 17/497,423

(22) Filed: Oct. 8, 2021

(65) Prior Publication Data

US 2022/0023973 A1     Jan. 27, 2022

Related U.S. Application Data

(63) Continuation of application No. 15/645,448, filed on Jul. 10, 2017, now Pat. No. 11,148,228.

(51) Int. Cl.
*B23K 26/362* (2014.01)
*B23K 26/361* (2014.01)
(Continued)

(52) U.S. Cl.
CPC .......... *B23K 26/362* (2013.01); *B23K 26/361* (2015.10); *C03C 17/3642* (2013.01); *C03C 17/3681* (2013.01); *C03C 23/0025* (2013.01)

(58) Field of Classification Search
CPC ............ B23K 26/0626; B23K 26/0622; B23K 26/40; B23K 26/402; B23K 26/362;
(Continued)

(56) References Cited

U.S. PATENT DOCUMENTS

| 4,716,686 A | 1/1988 | Lisec |
| 5,131,967 A * | 7/1992 | Tweadey, II ...... B32B 17/10174 |
| | | 156/272.8 |

(Continued)

FOREIGN PATENT DOCUMENTS

| CA | 2969290 A1 | 6/2016 |
| CN | 103402940 A | 11/2013 |

(Continued)

OTHER PUBLICATIONS

Notice of Reasons for Refusal received for Japanese Patent Application No. 2020-501190, mailed on Apr. 4, 2022, 9 pages (5 pages of English translation and 4 pages of official notification).

(Continued)

*Primary Examiner* — Sang Y Paik
*Assistant Examiner* — Bonita Khlok

(57) ABSTRACT

Certain example embodiments of this invention relate to techniques for laser ablating/scribing peripheral edges of a coating (e.g., a low-emissivity, mirror, or other coating) on a glass or other substrate in a pre- or post-laminated assembly, pre- or post-assembled insulated glass unit, and/or other product, in order to slow or prevent corrosion of the coating. For example, a 1064 nm or other wavelength laser may be used to scribe lines into the metal and/or metallic layer(s) in a low-emissivity or other coating provided in an already-laminated or already-assembled insulated glass unit or other product, e.g., around its periphery. The scribe lines decrease electron mobility from the center of the coating to the environment and, thus, slow and sometimes even prevent the onset of electrochemical corrosion. Associated products, methods, and kits relating to same also are contemplated herein.

20 Claims, 5 Drawing Sheets

(51) Int. Cl.
*C03C 17/36* (2006.01)
*C03C 23/00* (2006.01)

(58) Field of Classification Search
CPC .. B23K 26/361; B23K 2103/54; B23K 26/08; B23K 26/0869; B23K 26/0892; B23K 26/10; B23K 26/364; B23K 26/38; B23K 26/359; B23K 26/354; C03C 17/3642; C03C 17/3681; C03C 23/0025; C03C 17/3626; C03C 2218/328; B32B 15/04; B32B 17/06; B32B 17/10036; B32B 17/1099; B32B 17/10174; B32B 17/10183; B32B 2551/08; E06B 3/66; E06B 3/673; G02B 5/0875
USPC .................. 219/121.69, 203, 121.6–121.61, 219/121.78–121.8
See application file for complete search history.

(56) References Cited

U.S. PATENT DOCUMENTS

| | | | |
|---|---|---|---|
| 5,153,054 | A | 10/1992 | Depauw et al. |
| 5,598,285 | A | 1/1997 | Kondo et al. |
| 5,650,597 | A | 7/1997 | Redmayne |
| 5,713,986 | A | 2/1998 | Franz et al. |
| 5,838,037 | A | 11/1998 | Masutani et al. |
| 5,926,702 | A | 7/1999 | Kwon et al. |
| 5,934,982 | A | 8/1999 | Vianello et al. |
| 6,016,178 | A | 1/2000 | Kataoka et al. |
| 6,177,918 | B1 | 1/2001 | Colgan et al. |
| 6,204,897 | B1 | 3/2001 | Colgan et al. |
| 6,356,335 | B1 | 3/2002 | Kim et al. |
| 6,362,028 | B1 | 3/2002 | Chen et al. |
| 6,580,093 | B2 | 6/2003 | Chung et al. |
| 6,884,569 | B2 | 4/2005 | Nakashima |
| 6,971,948 | B2 | 12/2005 | Valek et al. |
| 6,988,938 | B2 | 1/2006 | Valek et al. |
| 7,071,036 | B2 | 7/2006 | Yang |
| 7,105,220 | B2 | 9/2006 | Freeman et al. |
| 7,125,462 | B2 | 10/2006 | Disteldorf |
| 7,140,953 | B1 | 11/2006 | Raynauld |
| 7,215,331 | B2 | 5/2007 | Song et al. |
| 7,372,510 | B2 | 5/2008 | Abileah |
| 7,408,606 | B2 | 8/2008 | Shih |
| 7,436,393 | B2 | 10/2008 | Hong et al. |
| 7,589,799 | B2 | 9/2009 | Lai |
| 7,601,436 | B2 | 10/2009 | Djurovich et al. |
| 7,602,360 | B2 | 10/2009 | Park |
| 7,629,741 | B2 | 12/2009 | Liao et al. |
| 7,659,661 | B2 | 2/2010 | Park |
| 7,662,663 | B2 | 2/2010 | Cok et al. |
| 7,663,311 | B2 | 2/2010 | Im et al. |
| 7,663,312 | B2 | 2/2010 | Anandan |
| 8,040,141 | B2 | 10/2011 | Heckleman et al. |
| 8,434,904 | B2 | 5/2013 | Alvarez |
| 8,449,348 | B2 | 5/2013 | Sondag |
| 8,492,788 | B2 | 7/2013 | Veerasamy et al. |
| 8,747,959 | B2 | 6/2014 | Krasnov et al. |
| 10,987,902 | B2 | 4/2021 | Veerasamy |
| 2004/0119403 | A1 | 6/2004 | McCormick et al. |
| 2004/0146645 | A1* | 7/2004 | Freeman ........... B32B 17/10174 427/256 |
| 2004/0229073 | A1 | 11/2004 | Dietrich et al. |
| 2008/0210303 | A1 | 9/2008 | Lu et al. |
| 2008/0308151 | A1 | 12/2008 | Den Boer et al. |
| 2009/0004412 | A1 | 1/2009 | Decroupet |
| 2011/0023739 | A1 | 2/2011 | Yoshito et al. |
| 2011/0100445 | A1 | 5/2011 | Krasnov |
| 2011/0217455 | A1 | 9/2011 | Veerasamy |
| 2012/0026573 | A1 | 2/2012 | Collins et al. |
| 2012/0060916 | A1 | 3/2012 | Den Boer et al. |
| 2012/0200816 | A1 | 8/2012 | Krasnov et al. |
| 2013/0005135 | A1 | 1/2013 | Krasnov et al. |
| 2013/0005139 | A1 | 1/2013 | Krasnov et al. |
| 2013/0015677 | A1 | 1/2013 | Benito |
| 2013/0164464 | A1 | 6/2013 | Lage |
| 2015/0093466 | A1 | 4/2015 | Estinto |
| 2016/0133468 | A1 | 5/2016 | Doany et al. |
| 2019/0009371 | A1 | 1/2019 | Veerasamy |

FOREIGN PATENT DOCUMENTS

| | | |
|---|---|---|
| CN | 104114510 A | 10/2014 |
| CN | 104507886 A | 4/2015 |
| CN | 104837785 A | 8/2015 |
| CN | 105452519 A | 3/2016 |
| CN | 106537243 A | 3/2017 |
| DE | 196 44 004 | 5/1998 |
| EP | 0 104 870 | 4/1984 |
| EP | 0 733 931 | 9/1996 |
| EP | 0 839 644 | 5/1998 |
| EP | 1 194 385 | 4/2002 |
| EP | 1194385 B1 * | 10/2011 |
| EP | 3 034 295 | 6/2016 |
| FR | 2 936 241 | 3/2010 |
| JP | 2010087041 A | 4/2010 |
| JP | 2013073894 A | 4/2013 |
| JP | 2013223886 A | 10/2013 |
| JP | 2014533232 A | 12/2014 |
| JP | 2015067330 A | 4/2015 |
| JP | 2016532626 A | 10/2016 |
| JP | 2017-514774 | 6/2017 |
| RU | 2623920 C2 | 11/2021 |
| WO | 2012036097 A1 | 3/2012 |
| WO | 2014/072137 | 5/2014 |

OTHER PUBLICATIONS

"Evolution and Tailoring of Plasmonic Properties in Ag: ZrO2 Nanocomposite Films by Swift Heavy Ion Irradiation"; Kumar et al., Journal of Applied Physics 109 (2011), 6 pages.
First Examination Report received for Indian application No. 202047005035, mailed on Jul. 23, 2021, 6 pages.
Webster dictionary for the term "absorb" (Year: 2020), 12 pages.
Richa Agrawal and Chunlei (Peggy) Wang, "Laser Beam Machining", published 2016 (Year: 2016), 15 pages.
Notification of Reasons for Refusal received for JP application No. 2020-501190, mailed on Sep. 12, 2022, 7 pages. (4 pages of english translation and 3 pages of official copy).

* cited by examiner

TECHNIQUES FOR LASER ABLATION/SCRIBING OF COATINGS IN PRE- AND POST-ASSEMBLED INSULATED GLASS UNITS, AND/OR ASSOCIATED METHODS

CROSS REFERENCE TO RELATED APPLICATION

This application is a continuation of U.S. application Ser. No. 15/645,448 filed Jul. 10, 2017, the entire content of which is hereby incorporated herein by reference.

TECHNICAL FIELD

Certain example embodiments of this invention relate to techniques for laser ablation/scribing of coatings in pre- and post-laminated assemblies, pre- and post-assembled insulated glass units, and/or other products, as well as associated methods. More particularly, certain example embodiments of this invention relate to techniques for laser ablating/scribing peripheral edges of a coating (e.g., a low-emissivity, mirror, or other coating) on a glass or other substrate in a pre- or post-laminated assembly, pre- or post-assembled insulated glass unit, and/or other product, in order to slow or prevent corrosion of the coating, and/or associated products.

BACKGROUND AND SUMMARY

Laminated products have been used in a variety of applications including, for example, low-emissivity (low-E), mirror, and other applications. FIG. 1 is a cross-sectional view of an example laminated product 100. The FIG. 1 example laminated product 100 includes first and second substantially parallel, spaced-apart substrates (e.g., glass substrates) 102a and 102b, laminated together with a laminating material 104, also sometimes called an interlayer. Typical laminating materials include, for example, PVB, EVA, PET, PU, and the like. Depending on the application, the laminating material 104 may be optically "clear," i.e., it may have a high visible transmission. One or more coatings may be formed on one or more major surfaces of the first substrate 102a and/or the second substrate 102b. For example, it is not uncommon to include a low-E, mirror, antireflection (AR), or other coating on the second or third surface of a laminated product. In some instances, a coating may be provided to each of the second and third surfaces. For ease of understanding, FIG. 1 includes an example coating 106 on surface 3. An optional additional edge seal 108 may be provided around a periphery of the article 100, and the edge seal 108 may be intended to protect the side edges of the article 100, the laminating material 104, the coating 106, etc., from mechanical, environmental, and/or other types of damage.

One problem with laminated products is that laminated metal layer inclusive thin films and laminated metallic layer inclusive thin films, such as those oftentimes used in mirror and low-E coatings, can gradually corrode from the edge to the center of the lite, e.g., when exposed to gradients in temperature, humidity, etc. Corrosion happens in presence and ingress of ionized moisture. Edge defects in the lamination process and a lack of edge deletion, can also trigger corrosion. Although edge sealants can be used to reduce the likelihood of the advance of the corrosion front, such techniques may not be practical, as these sealants can also develop cracks over time.

Edge deletion generally involves removing a portion of the coating around peripheral edges of the underlying substrate, and edge deletion tables are known. See, for example, U.S. Pat. Nos. 4,716,686; 5,713,986; 5,934,982; 6,971,948; 6,988,938; 7,125,462; 7,140,953; and 8,449,348, each of which is hereby incorporated herein in its entirety. In general, in such tables, a series of casters provided to the table allow for smooth movement of glass across the surface of the table. Grinding wheels of various widths may be used in connection with shields to help reduce the scattering of debris and for safety purposes. Passing the glass substantially consistently under the deletion head efficiently "deletes" the coating from the glass so that it can be used, for example, in connection with the above-described and/or other articles. Wider or narrower grinding wheels may be used to delete more or less coating from the glass surface.

Although edge deletion tables can be used in a variety of applications, they unfortunately have their limitations, especially when it comes to corrosion prevention. For example, edge deletion tables oftentimes are large and require additional machinery in a process line. The addition of process steps can increase processing time and costs. Edge deletion tables, by their nature, can also create debris that needs to be dealt with accordingly. Thus, although edge deletion can sometimes remove edge defects, it also can cause them by virtue of the creation of additional debris.

Moreover, although edge deletion tables oftentimes are suitable for edge deletion, as their name implies, they oftentimes are limited in the ability to remove coatings in interior areas. This can become increasingly problematic as the area(s) to be removed become smaller and smaller, as there is a practical limit to the size reductions possible for grinding wheels and the like. And because edge deletion tables function on exposed surfaces, they can do nothing to "fix" already-assembled products and must be used early and in a potentially disadvantageous time in a process line.

Certain example embodiments address these and/or other concerns. For example, certain example embodiments relate to techniques for stopping or at least slowing the advancement of the corrosion or delamination edge-front relative to a coating in a laminated product.

Certain example embodiments are based on the recognition, from work on soft low-E coatings, that electrochemical corrosion, driven by both stress and ionized moisture ingress, is a main thermodynamic force behind this phenomenon. Based on this recognition, certain example embodiments seek to electrically isolate the coating from the edge, while simultaneously shunting the layers and de-stressing the stack. In this regard, certain example embodiments include laser-scribing the edge of a metal layer inclusive coating or metallic layer inclusive coating on a cladded laminate. As one example, laser-scribing of the coating through the laminate may be performed using a diode fiber laser operating at 1064 nm. By optimizing or at least tuning the width and position of the scribe with respect to glass edge, film corrosion can be either stopped or retarded. The viability of the laser scribe technique is related to the fact that glass substrates and many laminating materials (including PVB, which is very commonly used) are transparent to 1064 nm laser irradiation and thus cannot be etched directly (or at least cannot easily be etched directly with certain lasers including, for example, 1064 nm lasers).

In certain example embodiments, a method of making a laminated product is provided. An intermediate product includes first and second substantially parallel glass substrates that are laminated together with a laminating material, with the first glass substrate having had a multilayer thin film coating formed thereon, and with the coating including at least one metal-inclusive layer and being susceptible to corrosion. In making the laminated product, a line is laser-scribed in the coating by exposing the intermediate product to a laser source, with the line creating a barrier to electron transport between opposing sides thereof.

In certain example embodiments, a method of making a laminated product is provided. A multilayer thin film coating is formed on a first glass substrate, with the coating including at least one metal-inclusive layer and being susceptible to corrosion. The first glass substrate is laminated to a second glass substrate using a laminating material so that the coating is oriented between the first and second substrates and so that the first and second substrates are substantially parallel to one another. Following the laminating, and in making the laminated product, a border line is laser-scribed around a periphery of the coating. The laser-scribing at least partially dissolves the coating proximate to the border line and increases electrochemical corrosion resistance of the coating internal to the border line by electrically isolating the coating internal to the border line. Dissolved material from the coating, by virtue of the laser-scribing, is (a) incorporated into the first substrate, laminating material, and/or an underlayer of the coating, and/or (b) ablated and/or vaporized so as to re-form in a non-conductive manner.

In certain example embodiments, a laminated product is provided. A first glass substrate supports a multilayer thin film coating. The coating includes at least one metal-inclusive layer and is susceptible to corrosion. A second glass substrate is laminated to the first glass substrate using a laminating material so that the coating is oriented between the first and second substrates and so that the first and second substrates are substantially parallel to one another. A laser-scribed border is formed around a periphery of the coating formed after the first and second substrates have been laminated together. At least the at least one metal-inclusive layer of the coating proximate to the border is dissolved by virtue of the laser-scribing. Dissolved material from the coating, by virtue of the laser-scribing, is (a) incorporated into the first substrate, laminating material, and/or an underlayer of the coating, and/or (b) ablated and/or vaporized so as to re-form in a non-conductive manner. The border has a width and depth sufficient to electrically isolate an area internal to the border from an area external to the border to a level sufficient to at least retard electrochemical corrosion in the area internal to the border.

In certain example embodiments, a kit for making a laminated product. The kit includes a laser source and an intermediate product including first and second substantially parallel glass substrates that are laminated together with a laminating material, with the first glass substrate having had a multilayer thin film coating formed thereon, and with the coating including at least one metal-inclusive layer and being susceptible to corrosion. The laser source is controllable to laser-scribe a line in the coating by exposing the intermediate product to a laser source in making the laminated product, with the line creating a barrier to electron transport between opposing sides thereof.

In certain example embodiments, a method of making a laminated product comprises: having an intermediate product, the intermediate product including first and second substantially parallel glass substrates that are laminated together with a laminating material, the first glass substrate having had a multilayer thin film coating formed thereon, the coating including at least one metal-inclusive layer; and coupling energy into the coating by exposing the intermediate product to a laser from a laser source operating at a wavelength at which the second glass substrate and the laminating material are substantially transmissive in making the laminated product, the energy being coupled into the coating and the laser source being controlled so as to selectively cause at least a part of the coating, in a desired pattern, to (a) dissolve into the first substrate, the laminating material, and/or an underlayer of the coating, and/or (b) vaporize and re-form in a manner that does not conduct, the desired pattern defining at least first and second areas and being formed to a width and depth sufficient to electrically isolate the first and second areas from one another, the electrical isolation being at a level sufficient to at least substantially retard electrochemical corrosion in the first area.

In a similar respect, certain example embodiments relate to IG units made in the same or similar manners. For instance, in certain example embodiments, a method of making an IG unit is provided. An intermediate product includes first and second substantially parallel spaced apart glass substrates that are connected together with a peripheral edge spacer. A gap is defined between the first and second substrates. The first glass substrate has a multilayer thin film coating formed thereon. The coating includes at least one metal-inclusive layer and being susceptible to corrosion. A line is laser-scribed in the coating by exposing the intermediate product to a laser source in making the IG unit, with the line creating a barrier to electron transport between opposing sides thereof.

In certain example embodiments, a method of making an IG unit is provided. On a first glass substrate, a multilayer thin film coating is formed, with the coating including at least one metal-inclusive layer and being susceptible to corrosion. The first glass substrate is connected to a second glass substrate in connection with a peripheral edge spacer so that the coating is oriented between the first and second substrates and so that the first and second substrates are substantially parallel to, and spaced apart from, one another. Following the connecting, a border line is laser-scribed around a periphery of the coating in making the IG unit. The laser-scribing at least partially dissolves the coating proximate to the border line and increases electrochemical corrosion resistance of the coating internal to the border line by electrically isolating the coating internal to the border line. At least the at least one metal-inclusive layer is dissolved, by virtue of the laser-scribing, such that associated ablated material is (a) re-formed in a non-conductive manner, and/or (b) dissolved and/or diffused into the first substrate and/or at least one other layer of the multilayer thin film coating.

In certain example embodiments, an IG unit is provided. A first glass substrate supports a multilayer thin film coating, with the coating including at least one metal-inclusive layer and being susceptible to corrosion. A second glass substrate is substantially parallel to and spaced apart from the first glass substrate, with the coating being oriented between the first and second substrates. An edge seal is included. A laser-scribed border around a periphery of the coating is formed after the first and second substrates have been connected together. At least the at least one metal-inclusive layer of the coating proximate to the border is dissolved by virtue of the laser-scribing. Dissolved material from the coating, by virtue of the laser-scribing, is (a) incorporated into the first substrate and/or an underlayer of the coating, and/or (b) ablated and/or vaporized so as to re-form in a non-conductive manner. The border has a width and depth sufficient to electrically isolate an area internal to the border from an area external to the border to a level sufficient to at least retard electrochemical corrosion in the area internal to the border.

In certain example embodiments, a kit for making an IG unit is provided. The kit includes a laser source and an intermediate product. The intermediate product includes first and second substantially parallel spaced apart glass substrates that are connected together with a peripheral edge spacer, a gap being defined between the first and second substrates, the first glass substrate having had a multilayer thin film coating formed thereon, the coating including at least one metal-inclusive layer and being susceptible to corrosion. The laser source is controllable to laser-scribe a line in the coating by exposing the intermediate product to a laser source in making the IG unit, the line creating a barrier to electron transport between opposing sides thereof.

In certain example embodiments, a method of making an IG unit is provided, with the method comprising: having an intermediate product, the intermediate product including first and second substantially parallel spaced apart glass substrates that are connected together with a peripheral edge spacer, a gap being defined between the first and second substrates, the first glass substrate having had a multilayer thin film coating formed thereon, the coating including at least one metal-inclusive layer; and coupling energy into the coating by exposing the intermediate product to a laser from a laser source operating at a wavelength at which the second glass substrate is substantially transmissive in making the IG unit, the energy being coupled into the coating and the laser source being controlled so as to selectively cause at least a part of the coating, in a desired pattern, to (a) dissolve into the first substrate and/or an underlayer of the coating, and/or (b) vaporize and re-form in a manner that does not conduct, the desired pattern defining at least first and second areas and being formed to a width and depth sufficient to electrically isolate the first and second areas from one another, the electrical isolation being at a level sufficient to at least substantially retard electrochemical corrosion in the first area.

In a similar respect, certain example embodiments relate to a coated article including a substrate supporting a multilayer thin film coating and/or a method of making the same. The thin film coating is laser scribed so as to create at least first and second areas, the first and second areas being electrically isolated form one another by virtue of the laser scribing. The laser scribing may be performed when the coating of the coated article is in a closed or open geometry relative to the coated article and/or anything into which it might be built.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
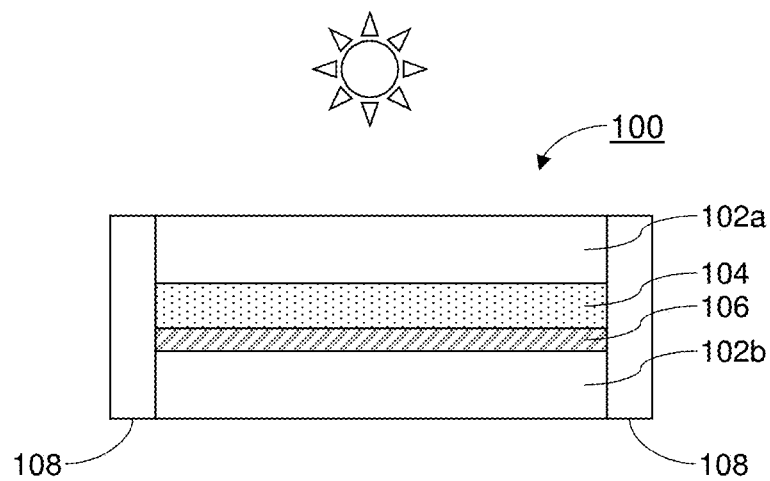
FIG. 1 is a cross-sectional view of an example laminated product.

Certain example embodiments relate to techniques for laser ablating/scribing peripheral edges of a metal layer inclusive or metallic layer inclusive coating (e.g., a low-emissivity, mirror, or other coating) on a glass or other substrate in a pre- or post-laminated assembly, insulated glass unit (IG unit or IGU), or other product, in order to slow or prevent corrosion of the coating, and/or associated products. Certain example embodiments may be used in connection with products having coatings that have already started to erode, e.g., even after such products have been installed (for example, in a building, vehicle, etc.).

Corrosion can be thought of as the deterioration of materials by chemical processes. One subset is electrochemical corrosion of metals, in which the oxidation process $M \rightarrow M^+ + e^-$ is facilitated by the presence of a suitable electron acceptor. At the electron acceptor site, an in-series resistance, called polarization resistance, develops. The magnitude of this resistor affects the rate of corrosion. One characteristic of most corrosion processes is that the oxidation and reduction steps occur at separate locations on the metal. This is possible because metals are conductive, so the electrons can flow through the metal from the anodic to the cathodic regions. The presence of water aids in transporting ions to and from the metal, but a thin film of adsorbed moisture can be sufficient to enable corrosion.

Thus, it will be appreciated that a corrosion system can be regarded as a short-circuited electrochemical cell including anodic and cathodic steps that follow general patterns. For example, the anodic process may resemble something like:

$$M(s) \rightarrow M^{x+}(aq) + xe^-$$

The cathodic processes can be any of:

$$O_2 + 2H_2O + 4e^- \rightarrow 4OH^-$$

$$H^+ + e^- \rightarrow \tfrac{1}{2}H_2(g)$$

$$M1^{x+} + xe^- \rightarrow M1(s)$$

where M1 is another metal.

Many currently available low-E coatings include a layer comprising Ag directly on and contacting a layer comprising ZnO and directly under and contacting a layer comprising Ni (e.g., a layer comprising NiCr, NiTi, or an oxide thereof). In such systems, from a simplistic thermodynamic modeling perspective, layers with electrochemical potentials lower than that of Ag will "preferentially" corrode. A layer comprising Ni, for example, will start to corrode very quickly relative to a layer comprising Ag and, in such systems, the entire interface therebetween can be compromised. On the other hand, when a layer comprising ZnO and a layer comprising Ag are considered, the situation is reversed, as the layer comprising Ag will corrode faster (both with and without light). A layer comprising NiO also will "outperform" the layer comprising Ag. Of course, this model assumes completion of the electrical circuit and the role of $H_2O$ providing the $H^+$ ions in the presence of electrolytes such as, for example, salts.

Several standard electrode potentials are given in the following table, in volts relative to the standard hydrogen electrode:

| Half-Reaction | | | |
|---|---|---|---|
| Oxidant | ⇌ | Reductant | E° (V) |
| $Ni^{2+} + 2e^-$ | ⇌ | Ni(s) | −0.25 |
| $Ag^+ + e^-$ | ⇌ | Ag(s) | +0.7996 |
| $NiO_2(s) + 4H^+ + 2e^-$ | ⇌ | $Ni^{2+} + 2OH^-$ | +1.59 |

Other commonly available low-E coatings involve a layer comprising Ag sandwiched between and directly contacting layers comprising NiCr. (Specific example coatings of this type will be discussed in greater detail below.) Based on electrochemical potentials, in such coatings, the corrosion of the metallic Ni present in the NiCr-inclusive barrier layers that surround the Ag will result in an "adhesive release" and subsequent agglomeration of the silver, which is one of the fingerprints of electrochemical corrosion. An electrolyte containing water in electrical contact with both metals will exacerbate the "preferential" corrosion of the Ni and, eventually, lead to corrosion of the Ag.

Figure 2:
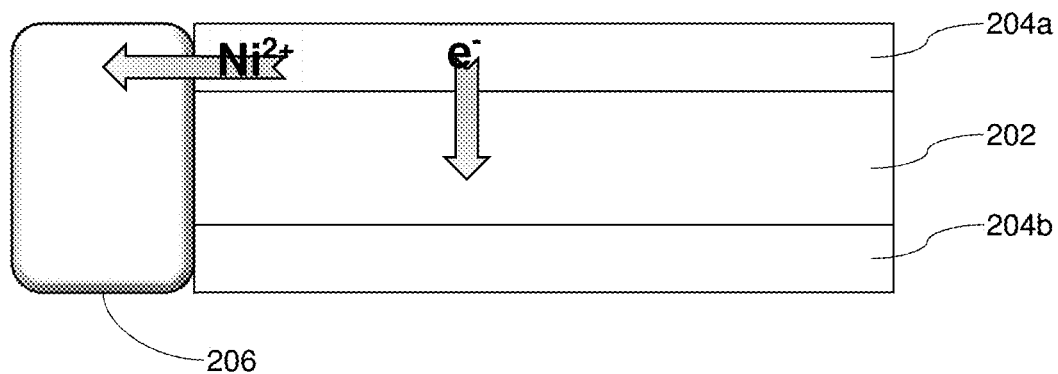
FIG. 2 schematically illustrates one example corrosion mechanism.

FIG. 2 schematically illustrates this corrosion mechanism. As shown in FIG. 2, a layer comprising Ag 202 is sandwiched between first and second layers comprising NiCr 204a and 204b. An electrolyte 206 (in water) is in contact with these layers. Electrons will migrate into the layer comprising Ag 202, while there will be preferential leaching of Ni2+ from one or both layers comprising NiCr 204a/204b into the electrolyte 206. The overall mechanism results in the "preferential" dissolution and re-deposition of (corroded) Ni, together with the agglomeration or "clotting" of Ag.

Still other commonly available low-E coatings involve a layer comprising zinc oxide (e.g., a layer comprising zinc oxide which may include aluminum, tin, and/or the like), a layer comprising Ag formed on (optionally directly on an in direct physical contact with) the layer comprising zinc oxide, and a layer comprising Ni, Cr, and/or Ti, or an oxide thereof (e.g., NiCr, NiCrOx, NiTi, NiTiOx, etc.) formed on (optionally directly on an in direct physical contact with) the layer comprising Ag. In layer stacks comprising ZnOx/Ag/NiCrOx, relatively small and oxidized Ni present suggested a different mechanism of Ag corrosion, with nominally no interfacial release which, as evidenced from testing and analysis, was significantly less visually objectionable.

When placed in an electrolyte (e.g., salt plus $H_2O$), split Ag layer stacks (e.g., where the same metallic structure material is used but split spatially with dielectrics that are electrically active) can develop differences in potential as a result of biaxial stress becoming interfacial stress; metal grain composition; imperfections, scratches, threads, etc., being exposed; electrolyte gradient in the dielectric, laminating PVB or other material, etc.; and/or the like.

In so-called double silver low-E products, one of the two silver layers can start to corrode preferentially with respect to the other, mediated by the electrolyte gradient in the electrically active dielectric, which acts as a polarization layer. This is similar to a battery setting up a voltage difference as a result of a chemical potential imbalance. One of the Ag layers becomes anodic with respect to the remainder of the stack, and the other Ag will preferentially corrode. However, here this action occurs where the dielectric integrity is compromised and water vapor can get into the layers. The water vapor transmission rate (WVTR) thus can become an important parameter. The electrochemical model predicts that if there is no ionized moisture ingress, the corrosion front should not move.

In a related regard, the electrochemical model of corrosion makes some other predictions that can be useful for future designs, namely, that the thickness ratio of the Ag to NiCr ratio also affects propensity of corrosion. Surprisingly, modelling also predicts that the ionic conductivity/polarization of the glass can help reduce corrosion. Thus, a thinner underlayer or an ionic underlayer should help reduce corrosion.

Figure 3:
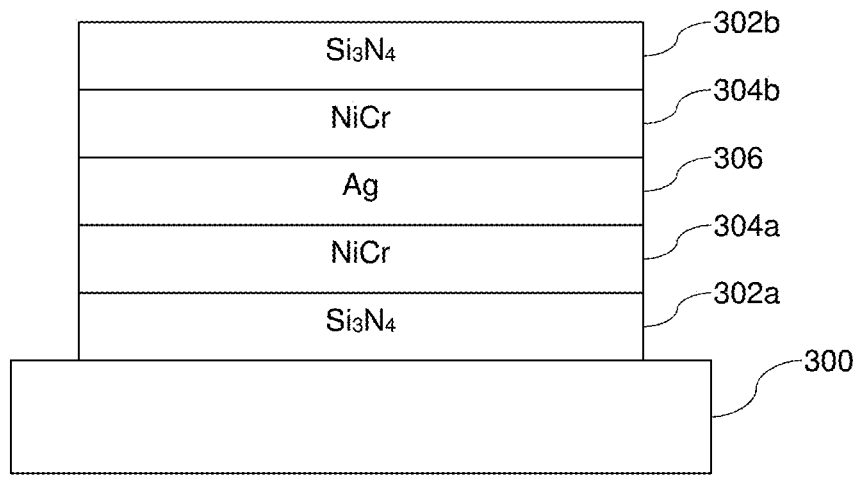
FIG. 3 is a schematic cross-sectional view of an example low-emissivity coating that sometimes encounters corrosion problems.

To help assess the models, consider FIG. 3, which is a cross-sectional view of an example low-E layer stack arrangement. As shown in FIG. 3, a substrate 300 supports a first silicon-inclusive layer 302a (e.g., a layer comprising silicon and an oxide and/or nitride thereof); a first layer comprising Ni, Cr, and/or Ti 304a (which may or may not be oxidized); a layer comprising silver 306; a second layer comprising Ni, Cr, and/or Ti 304b (which may or may not be oxidized); and a second silicon-inclusive layer 302b (e.g., a layer comprising silicon and an oxide and/or nitride thereof). The following three example layer thickness correspond to layers with different visual appearances and/or low-E and other performance:

EXAMPLE 1

| Layer | Preferred Thickness (nm) | More Preferred Thickness (nm) | Example Thickness (nm) |
|---|---|---|---|
| $Si_3N_4$ (302b) | 385-525 | 405-505 | 455 |
| NiCr (304b) | 20-30 | 22-28 | 25 |
| Ag (306) | 95-135 | 100-130 | 115 |
| NiCr (304a) | 30-50 | 35-45 | 40 |
| $Si_3N_4$ (302a) | 110-150 | 115-145 | 130 |
| Glass (300) | N/A | N/A | N/A |

EXAMPLE 2

| Layer | Preferred Thickness (nm) | More Preferred Thickness (nm) | Example Thickness (nm) |
|---|---|---|---|
| $Si_3N_4$ (302b) | 435-595 | 460-570 | 515 |
| NiCr (304b) | 25-35 | 27-33 | 30 |
| Ag (306) | 105-145 | 110-140 | 125 |
| NiCr (304a) | 20-30 | 22-28 | 25 |
| $Si_3N_4$ (302a) | 235-325 | 250-310 | 280 |
| Glass (300) | N/A | N/A | N/A |

EXAMPLE 3

| Layer | Preferred Thickness (nm) | More Preferred Thickness (nm) | Example Thickness (nm) |
|---|---|---|---|
| $Si_3N_4$ (302b) | 360-490 | 380-470 | 425 |
| NiCr (304b) | 30-50 | 35-45 | 40 |
| Ag (306) | 55-75 | 58-72 | 65 |
| NiCr (304a) | 35-55 | 40-50 | 45 |
| $Si_3N_4$ (302a) | 260-360 | 280-340 | 310 |
| Glass (300) | N/A | N/A | N/A |

Considering the three examples above, Example 3 has the thickness undercoat (e.g., the layer comprising $Si_3N_4$ 302a), and it seemingly has the greatest propensity for corrosion. Example 1 has the thinnest undercoat (e.g., the layer comprising $Si_3N_4$ 302a), and it seemingly smallest propensity for corrosion. There are, however, additional or alternative hypotheses as to why these phenomena are encountered. First, it is possible that the undercoat (e.g., the layer comprising $Si_3N_4$ 302a) in Example 3 may be rougher than the corresponding layers in the other coatings, potentially caused by its greater thickness, and potentially leading to poorer interfacial adhesion and in turn leading to corrosion more easily. Second, there may be greater tensile strength in the Example 3 undercoat (e.g., the layer comprising $Si_3N_4$ 302a). TEM imaging and/or other tests may help evaluate the former, and stress-modified layer depositions achieving the same total thicknesses may help evaluate the latter. As suggested above, however, it is possible that these hypotheses may work individually or collectively to account for the relative ease of corrosion. In any event, regardless of the precise corrosion-facilitating mechanism at play, the example techniques set forth herein operate to slow down and potentially eliminate corrosion from occurring.

In this regard, because both the cathodic and anodic steps must take place for corrosion to occur, prevention of either one should stop corrosion. It might be possible to stop both processes by coating the object with a humidity barrier or other protective coating. However, even if this is done, there are likely to be places where the barrier is broken or does not penetrate, particularly if there are holes in the structure. A more sophisticated approach is to apply a slight negative charge to the metal, thus making it more difficult for the $M \rightarrow M^{2+} + 2e^-$ reaction to take place. If the film is encapsulated so that there is a gradient in humidity and oxygen from the periphery and center of the film, a yet more elegant approach involves inducing an equipotential scribe line that helps set up an extremely large polarization resistance. These approaches may be used in any suitable combination, in different example embodiments of this invention.

In this later regard, laser scribing experiments, in connection with a diode fiber laser at 1064 nm and through various glass thicknesses, were performed. An X-Y scanner heled guide the laser over the substrates, resulting in locally-isolated spots or continuous lines where overlapping spots were used. The focus plane and beam diameter (e.g., the size of the beam at the coating depth) was adjusted using optics in the laser head coupled with pre-determined gap spacers. In these experiences, the substrates were assumed to be transparent or at least substantially transparent (e.g., at least 85% transmissive, more preferably at least 90% transmissive, and still more preferably 95% or more transmissive) at 1064 nm, and coupling of the laser was targeted for the coating.

Figure 4:
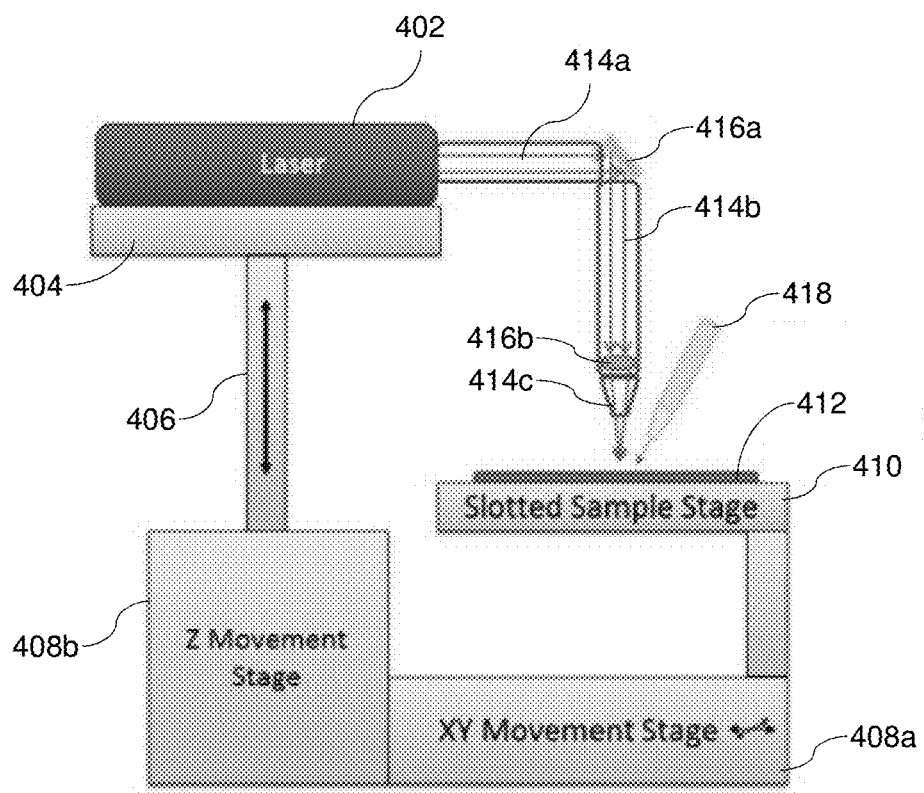
FIG. 4 is a schematic view of a laser scribing setup that may be used in connection with certain example embodiments.

FIG. 4 is a schematic view of a laser scribing setup that may be used in connection with certain example embodiments. The setup includes a laser 402 that sits atop a platform 404 and a column 406. The platform is movable in X-Y directions via an X-Y movement stage 408a, and in the Z direction via the Z movement stage 408b. Both the X-Y movement stage 408a and the Z movement stage 408b may be computer controllable, e.g., to focus light emitted from the laser 402 relative to the slotted sample stage 410 and the substrate 412 thereon. Output from the laser 402 is directed along a fixed-length tube towards first optics 416a, which redirects the output along a second tube 414b. Focusing and/or other optics 416b focuses the output from the laser 402 through the nozzle 414c and towards the slotted sample stage 410 and the substrate 412 thereon. A coolant jet 418 is provided to help cool the substrate 412 and/or components thereof (e.g., a coating therein or thereon, laminating material, and/or the like).

The laser can be controlled by adjusting the scan speed, pulse frequency/duty cycle, and/or the diode output power. The depth of focus also may be taken into account. These and/or other parameters may be adjusted using the structure noted above (e.g., the optics, stages, etc.). Scan speeds may range from 250-2000 mm/s, more preferably 500-1000 mm/s. Discrete "low" and "high" scan speeds may operate at, for example, 500 mm/s and 100 mm/s, respectively, in certain example embodiments. Pulse frequencies may range from 10-240 kHz, more preferably 20-160 kHz, and still more preferably 40-80 kHz. Discrete "low", "medium", and "high" pulse frequencies usable in connection with certain example embodiments are 40 kHz, 60 kHz, and 80 kHz, respectively. For a top glass substrate thickness of 3-4 mm (e.g., the glass substrate closest to the laser source), a diode laser power of 50-250 uJ, more preferably 75-200 uJ, and still more preferably 75-150 uJ, may be used. Furthermore, a beam diameter or major distance of 20-500 um, more preferably 20-250 um, and still more preferably 50-150 um, may be used. A beam radius, for example, may be adjusted via the optics on the laser output, to have these and/or other characteristics. In certain example embodiments, a beam diameter of about 100 um delivering a laser power pulse at or just about 100 uJ (e.g., 100-115 uJ) may be particularly advantageous for 4 mm glass. In order to optimize or improve the scribing process for the particular coating, the laser power and pulse frequency may be adjusted to provide, as an approximate center point, these values. Scribe lengths of 1-24 inches, and sometimes even shorter or longer are possible, with a scribe length of 12 inches being one example that has been found to work with certain example embodiments. As one example, operating at 5-15% of an 80 W power source for an 1064 nm laser has been found to be sufficient for certain example embodiments.

The depth of focus may be varied to target the top of the coating, the bottom of the coating, or the metallic layer(s) of the coating in different example embodiments.

Figure 5:
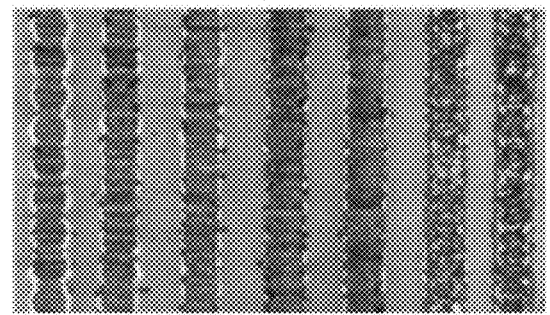
FIG. 5 shows scribe lines obtained with a 1064 nm nano-second pulsed laser, which may be used in connection with certain example embodiments.

In certain example embodiments, pulse energy and movement can be used to create scribing spot overlaps. In this regard, FIG. 5 shows scribe lines obtained with a 1064 nm nano-second pulsed laser, which may be used in connection with certain example embodiments. In FIG. 5, a 100 uJ pulse at a frequency of 20-80 kHz with a laser beam diameter of about 100 um was used. The lines moving from left-to-right show the effects of increasing spot overlaps. As can be seen, the conductivity is reduced with further overlaps. Multi-pass scribing (e.g., scribing with two or more lines on top of each other) may be used in certain example embodiments. In certain example embodiments, the scribe line width preferably will be at least 100-300 um, although a 500-800 um scribe line width would be more preferable. In certain example embodiments, one, two, three, or more scribe lines that are generally parallel to one another could be advantageously used to create successive electron transport barrier zones. In certain example embodiments, one or more line, dot, or other laser types may be used to form the scribes. Line lasers may be particularly advantageous in certain example embodiments, e.g., based on their ability to directly target lines. It will be appreciated that overlaps may be used with line, dot, and/or other laser types, in different example embodiments.

Figure 6:
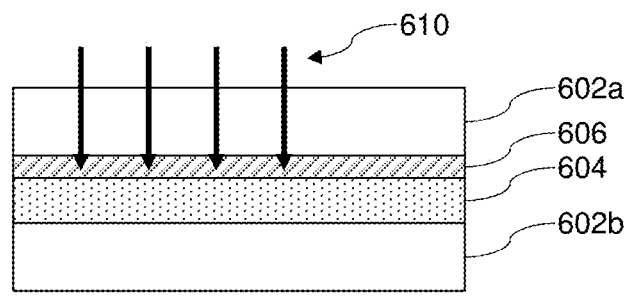
FIG. 6 is a first example setup showing how a laminated article can be laser scribed in accordance with certain example embodiments.
Figure 7:
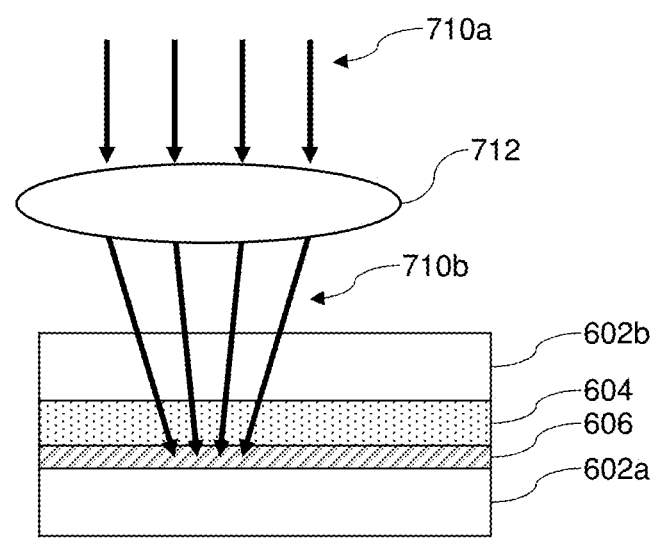
FIG. 7 is a second example setup showing how a laminated article can be laser scribed in accordance with certain example embodiments.

FIG. 6 is a first example setup showing how a laminated article can be laser scribed in accordance with certain example embodiments, and FIG. 7 is a second example setup showing how a laminated article can be laser scribed in accordance with certain example embodiments. FIGS. 6 and 7 include laminated products similar to that shown in and described in connection with FIG. 1. That is, in FIG. 6 and FIG. 7, first and second substrates 602a and 602b are laminated together using a laminating material/interlayer 604 (which may be PVB, EVA, PET, PU, and the like). The first substrate 602a supports a coating 606 (e.g., the coating from the FIG. 3 example, another coating as described herein, or some other coating having a metal or metallic layer and being susceptible to corrosion).

As shown in FIG. 6, energy 610 from a laser source is focused on the coating 606 and coupled into the metal and/or metallic layer(s) therein. As shown in FIG. 7, energy 710a from a laser source is redirected and focused on the coating 606 with the aid of additional optics 712. The redirected and focused energy 710b is coupled into the metal and/or metallic layer(s) in the FIG. 7 example. In addition to the presence of additional optics 712 in FIG. 7 compared to FIG. 6, FIG. 6 and FIG. 7 differ from one another in terms of their orientations relative to the laser sources (not shown). That is, the coating 606 is closer to the laser source than is the laminating layer 604 in FIG. 6, whereas the coating 606 is farther from the laser source than is the laminating layer 604 in FIG. 7. It is noted that certain example embodiments may use additional optics regardless of the position of the coating and laminating material relative to the laser source.

Certain example embodiments may implement an ablation approach that is selective and "self-regulating" in terms of depth, e.g., because of differences in absorption, thermo-mechanical properties of the substrate and the layers involved in the stack, and/or the like. One example of a self-regulating approach would involve the removal of both Ag and NiCr inclusive-layers, as well as the interlayers, from the FIG. 3 example coating, using (for example) a diode laser operating at a wavelength that is not absorbed by the underlying and overlying layers (which, in the FIG. 3 example, are layers comprising silicon nitride) and that is not absorbed by the substrate(s).

One challenge, however, relates to the fact that the target product has a closed geometry; that is, there is a question as to where the ablated material will go. This concern may be addressed in one or more of several ways. For example, ablated material may be vaporized but then re-form (e.g., re-deposit) in a manner that does not conduct. Alternatively, or in addition, ablated material from the coating may be allowed to dissolve into the substrate itself, into one or more thin film layers on the substrate (e.g., the layer comprising silicon nitride 302a in the FIG. 3 example), etc. Additionally, or alternatively, in a similar fashion, ablated material may be transferred into molten or at least softened laminating material (e.g., PVB), e.g., by diffusing or dissolving into it.

It will be appreciated, however, that potential damage or even ablation of the substrate may be problematic in some instances, as it may induce damage to an insulating or barrier layer between the substrate and the metal or metallic layer(s) in the coating (e.g., silicon-inclusive underlayers, bottom dielectric layers, and/or the like). Thus, certain example embodiments may operate at a power level and with a duty cycle sufficient to generate heat and/or otherwise cause the laminating material to at least partially soften so that the ablated material has a place to go, preferably without causing damage to the substrate underlying the coating and also preferably without causing removal of the barrier layer between the metal or metallic layer(s) in the coating and the underlying substrate. In this regard, the FIG. 7 orientation may be comparatively easier to work with, as ablating the bottom surface of the laminating material to cause energy to couple into the coating and preferentially target the metal or metallic layer(s) therein may be "safer," e.g., in terms of reducing or eliminating the exposure of the barrier layer and back contact to laser radiation. In certain example embodiments, it nonetheless may be desirable to cut through an entire coating.

If the contour of the laser scribe is too sharp or too jagged (i.e., the local radius curvature of the laser scribe profile is too sharp), then the cut in the PVB or laminating material may not be wide enough. This in turn will affect the polarization resistance and the series resistance. A straight line with no sharp bends may be preferable. In certain example embodiments, corners thus may be handled using overlapping straight lines (e.g., resulting in a plus- or cross-like arrangement at corners), using gradual curves (e.g., which may be "gone over" multiple times to ensure that proper grooves are formed), etc.

It has been found that the distance between the scribe line and the edge of the substrate can have an effect on whether and to what extent electrochemical corrosion can be slowed and/or stopped. For example, if the distance between the edge of the substrate and the scribe line is low, electrochemical corrosion can be slowed but not stopped. A distance of at least 3 mm, more preferably at least 5 mm, and still more preferably at least 10 mm is advantageous when it comes to not only slowing corrosion, but also to increasing the likelihood of corrosion being stopped.

Figure 8:
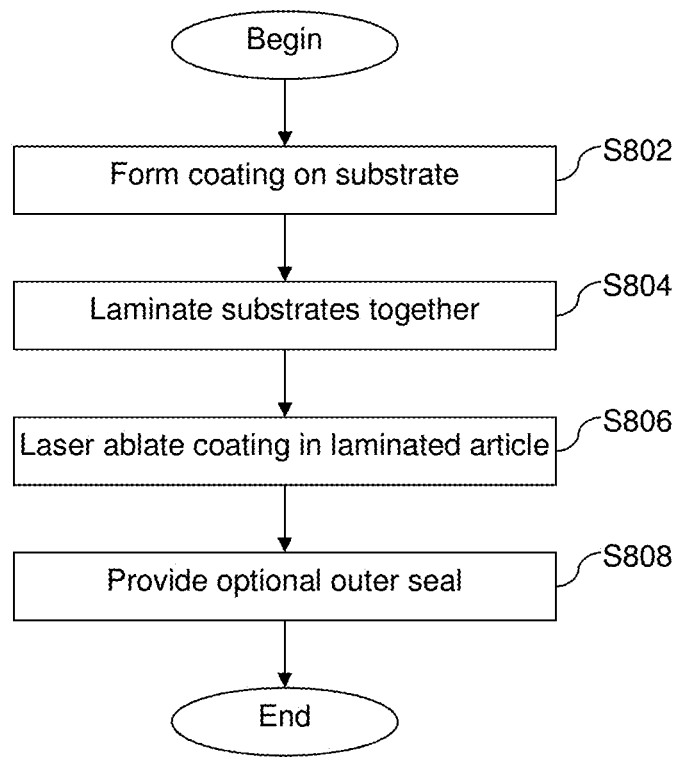
FIG. 8 is a flowchart showing an example process for laser-scribing a laminated article in accordance with certain example embodiments.

FIG. 8 is a flowchart showing an example process for laser-scribing a laminated article in accordance with certain example embodiments. A coating is formed on a substrate in step S802, with the coating being (for example) a multilayer thin film coating including at least one metal or metallic layer. The substrate with the coating thereon is laminated to another substrate using a laminating material in step S804. The laminated article is exposed to a laser source so that the coating is ablated in step S806. An optional outer seal is provided in step S808, so as to further protect the laminated article.

In this way, it is possible to laser-scribe/ablate a coating through glass and a laminating material or interlayer (such as PVB or the like) as a way to simulate edge deletion and also create a zone that serves as a barrier for electron transport between the edge of the coating and the center of the coating. By selecting parameters such as the width of the scribe, the power of the laser, the duty cycle, the wavelength of the laser, etc., it is possible to control the ablation and diffusion of the coating into the glass, PVB, and/or one or more other layers of the thin film coating. In so doing, electrochemical corrosion can be slowed or stopped. That is, the coating can be electrically isolated from the external environment to reduce and sometimes completely eliminate stray leakage currents that contribute to the eventual electrochemical erosion of the coating. Certain example embodiments are sufficient to provide for sub-pico A electrical isolation (e.g., electrical isolation less than 10 pico A, more preferably less than 1 pico A). That is, the corrosion rate may be decreased by orders of magnitude by accordingly increasing the series (Rs) and polarization resistance (Rp), and decreasing the shunt resistance. It is noted that the example techniques described herein may be used to electrically decouple areas such that the DC resistance between them is above the 30 gigaohm limit of conventional electrometer measuring devices and therefore can be taken as infinite in some sense.

As suggested above, a high-quality edge sealant may be used to provide additional protection, but the laser scribing can provide yet better insensitivity to weathering elements in at least some respects, e.g., by reducing and sometimes completely eliminating interface current carrying elements to the environment along which moisture can enter and leakage current can exit. This improvement is possible even in the presence of a laminate, which otherwise tends to increase the leakage current by orders of magnitude by virtue of moisture in the laminate (e.g., as PVB in contrast to EVA transmits that moisture) and is responsible for a broad range of life-limiting degradation effects related to electrochemical corrosion. Certain example embodiments advantageously reduce the likelihood of intra-cohesive failures of the coating stack, e.g., related to electrochemical corrosion related to potential differences in which anodic metallization dissolves and cathodic metallization usually dominates.

The laser scribing advantageously raises the internal resistance of the electrochemical corrosion path to the environment by orders of magnitude. It is estimated that it is possible to realize a more than six order of magnitude decrease in leakage current in some instances. Moreover, the deeper and wider the scribe line is, the higher the resistance is likely to be. Electrical isolation also decouples the regime from ground and changes the standard electrical potential. The laser scribing of certain example embodiments advantageously also advantageous affects the polarization resistance. The higher this value is, the more the corrosion kinetics will be slowed. Still further, the laser scribing of certain example embodiments advantageously also can involve shunting two metallization layers so that their Fermi levels are at the same potentials.

Certain example embodiments have been described in connection with a 1064 nm laser. A 1064 nm laser has been found to be advantageous, because clear glass and PVB (and other laminating materials) are essentially transparent to such wavelengths. By contrast, some lower and some higher wavelength laser sources might heat the glass to too great of an extent, which could cause cracks and/or other damage to the glass. It is noted, however, that clear glass is not always used in all applications. Green and other tinted glasses, for example, are used in a number of different products in the U.S. and around the world, e.g., to obtain desired aesthetic affects. In such instances, 1064 nm wavelength light may be absorbed by or otherwise ineffectively coupled to the coating and, thus, it may be desirable to select a different wavelength laser source. For green glass, for example, a 540 nm or 420 nm wavelength laser may be desirable.

The scribe lines may be provided at the periphery of the products in certain example embodiments. As a result, mounting structures, decorative details, and/or the like may be used to obscure potentially resultant visible artifacts of the scribing. In example embodiments where multiple scribe lines are used, thicker scribe lines may be used closer to the periphery of the article, whereas thinner scribe lines may be used closer to the center of the article. Doing so could help ensure that more aesthetically displeasing or at least noticeable areas are covered.

In certain example embodiments, the example techniques described herein can be used to create patterns in metal- and metallic-layer inclusive coatings that can be routed to connectors outside of the glass.

It will be appreciated that the techniques of certain example embodiments may be used in connection with a handheld or portable laser source. The handheld or portable laser source may be used to scribe already-installed, distributed, or other products that are not suitable for in-line or manufacturing area adjustment, to impart electrochemical corrosion resistance properties. The handheld or portable laser source may be mounted to a stage or other blocking to as to facilitate controlled movement in two directions. Range-finding optics may be provided so that the source may be positioned at an appropriate distance from the product to facilitate focus on or proximate to the surface(s) to be treated.

In this vein, and in other scenarios as well, certain example embodiments can also work in connection with some already corroded areas. As will be appreciated from the description above, in common circumstances (e.g., including clear glass substrates, PVB laminating materials, etc.), when operating at a wavelength of 1064 nm, the laser's power will be absorbed first by the metal and/or metallic layer(s). This energy is then transferred via phonon coupling to the PVB or other laminating material and glass. Thus, if the laser scribing is performed in already-corroded areas, the absorption of the laser may not be high enough (as the metal is already corroded) to create an isolation channel in the PVB or other laminating material (i.e., the resistor in the electrochemical corrosion path). Thus, additional power may be needed. However, care may be taken to ensure that sufficient active or passive cooling is implemented, e.g., to reduce the likelihood of unwanted damage to the substrate and/or adjacent areas of the PVB or other laminating material.

Additionally, laser scribing in a corroded area may not provide an area of equipotential. In other words, a voltage difference may still exist in a laser-scribed corroded area, although this may not be enough to drive the corrosion front further. In some situations, the corrosion front may be driven further, albeit at very slow rate.

Thus, it will be appreciated that it is possible in at least some instances to scribe in already-corroded areas. However, the efficacy of doing so may vary.

Although certain example embodiments have been described as relating to laminated articles that have already been assembled, it will be appreciated that the scribing techniques disclosed herein may be used in connection with pre-laminated assemblies and, furthermore, in connection with coated articles that may be incorporated into products other than laminated products. For example, the scribing techniques disclosed herein may be used in connection with coated articles, insulated glass units (IG units) where first and second substantially parallel spaced apart substrates are separated in connection with an edge seal defining a gap therebetween (which may be filled with air and/or a noble gas such as Ar, Kr, Xe, and/or the like), vacuum insulated glass (VIG units) where first and second substantially parallel spaced apart substrates are separated in connection with an edge seal and a plurality of spacers with a gap being evacuated to a pressure less than atmospheric, etc.

Figure 9:
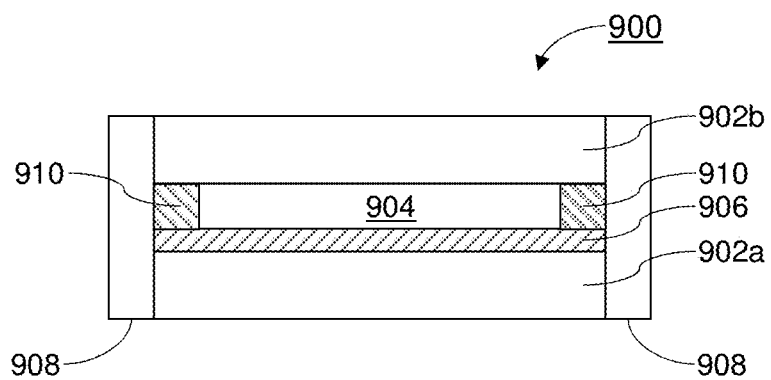
FIG. 9 is a cross-sectional view of an example insulated glass unit (IG unit or IGU) that may have a coating laser ablated in accordance with certain example embodiments.
Figure 10:
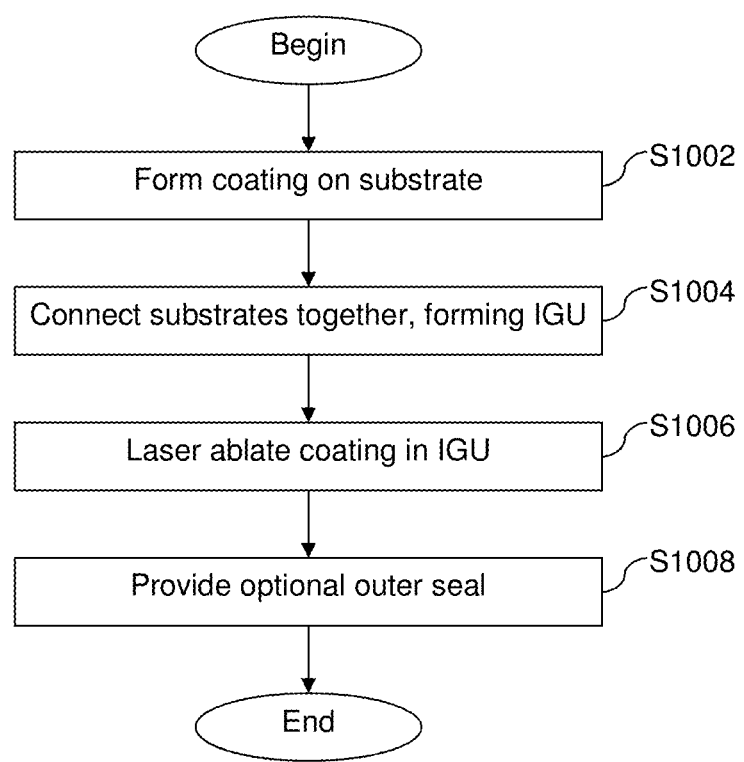
FIG. 10 is a flowchart showing an example process for laser-scribing an IG unit in accordance with certain example embodiments.

In this regard, FIG. 9 is a cross-sectional view of an example IG unit 900 that may have a coating laser ablated in accordance with certain example embodiments, and FIG. 10 is a flowchart showing an example process for laser-scribing an IG unit in accordance with certain example embodiments. FIG. 9 is similar to FIGS. 1 and 6-7, and FIG. 10 is similar to FIG. 8, except that FIGS. 9-10 relate to techniques for IG units, whereas FIGS. 1, 6-7, and 9 relate to techniques for laminated products. In any event, referring more particularly to FIGS. 9-10, first and second substrates 902a and 902b are provided for the IG unit 900. A multilayer thin film coating 906, which may comprise one or more metal-inclusive layers (e.g., in connection with a low-E or other coating) is formed on the first substrate 902a (step S1002 in FIG. 10). The first and second substrates 902a and 902b are connected together (step S1004 in FIG. 10) using peripheral edge spacer 910 and at least partially forming a gap 904. The IG unit 900 is exposed to a laser source so that the coating 906 is ablated (step S1006 in FIG. 10). The laser source may be oriented over the second substrate 902b, e.g., so as to reduce the likelihood of damaging the surface of the first substrate 902a. An optional outer seal 908 is provided (step S1008 in FIG. 10), so as to further protect the IG unit 900.

It is noted that certain example embodiments may in essence help "ruggedize" the coating and/or product, making it less susceptible by corrosion, without completely scribing lines. For example, if the laser power is controlled in a manner such that scribing does not occur but instead laser power is coupled into the coating, then the metal-inclusive layer(s) may be altered such that the sheet resistance drops. This type of reduction in sheet resistance may not create completely electrically isolated areas, but the sheet resistance reductions in the metal-inclusive layer(s) and/or coating as a whole may retard advancement of the corrosion front, etc.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making an IG unit is provided. An intermediate product includes first and second substantially parallel spaced apart glass substrates that are connected together with a peripheral edge spacer. A gap is defined between the first and second substrates. The first glass substrate has a multilayer thin film coating formed thereon. The coating includes at least one metal-inclusive layer and being susceptible to corrosion. A line is laser-scribed in the coating by exposing the intermediate product to a laser source in making the IG unit, with the line creating a barrier to electron transport between opposing sides thereof.

In addition to the features of the previous paragraph, in certain example embodiments, the laser source may be a 1064 nm laser source.

In addition to the features of either of the two previous paragraphs, in certain example embodiments, the laser source may be operated at a wavelength at which the second substrate is at least 90% transmissive.

In addition to the features of any of the three previous paragraphs, in certain example embodiments, the coating may be a low-emissivity coating including a layer comprising Ag. For instances, the coating may be formed: (a) so as to include at least one layer comprising Ni, Cr, and/or Ti, the at least one layer comprising Ni, Cr, and/or Ti being formed on and in physical contact with the layer comprising Ag; (b) so that the layer comprising Ag is sandwiched between and in direct physical contact with first and second layers comprising Ni, Cr, and/or Ti; and/or (c) so that the layer comprising Ag is formed on an in direct physical contact with a layer comprising zinc oxide.

In addition to the features of any of the four previous paragraphs, in certain example embodiments, the laser-scribing may be performed (a) to completely dissolve the coating proximate to the line; (b) to dissolve only a part of the coating proximate to the line; or (c) to dissolve at least a part of the coating proximate to the line, material from the dissolved part of the coating being re-deposited such that it does not conduct.

In addition to the features of any of the five previous paragraphs, in certain example embodiments, the coating may comprise a bottom dielectric layer directly on the first glass substrate and the laser-scribing may be performed to dissolve a portion of the coating including the at least one metal-inclusive layer but excluding the bottom dielectric layer. For instance, in certain example embodiments, the dissolved portion of the coating may be at least partially dissolved into the bottom dielectric layer.

In addition to the features of any of the six previous paragraphs, in certain example embodiments, heat generated by laser-scribing may be controlled to avoid damaging the surface of substrate on which the coating is formed. For instance, in certain example embodiments, the laser-scribing may be interrupted and the intermediate product may be cooled and/or allowed to cool during the interruption, in order to assist in controlling the generated heat. Additionally, or in the alternative, for instance, in certain example embodiments, the duty cycle and/or operating power of the laser source may be controlled in order to assist in controlling the generated heat.

In addition to the features of any of the seven previous paragraphs, in certain example embodiments, the line may have a width of at least 100-800 um.

In addition to the features of any of the eight previous paragraphs, in certain example embodiments, the line may be formed around a periphery of the intermediate article, e.g., with the barrier being defined around the periphery of the intermediate article.

In addition to the features of any of the nine previous paragraphs, in certain example embodiments, the laser-scribing may be practiced in connection with multiple overlapping scans of the laser source.

In addition to the features of any of the 10 previous paragraphs, in certain example embodiments, the laser-scribing may be performed to create a sub 10 pico-A electrical isolation barrier.

In addition to the features of any of the 11 previous paragraphs, in certain example embodiments, the second substrate may be oriented closer to laser source than first substrate during the laser-scribing.

In certain example embodiments, a method of making an IG unit is provided. On a first glass substrate, a multilayer thin film coating is formed, with the coating including at least one metal-inclusive layer and being susceptible to corrosion. The first glass substrate is connected to a second glass substrate in connection with a peripheral edge spacer so that the coating is oriented between the first and second substrates and so that the first and second substrates are substantially parallel to, and spaced apart from, one another.

Following the connecting, a border line is laser-scribed around a periphery of the coating in making the IG unit. The laser-scribing at least partially dissolves the coating proximate to the border line and increases electrochemical corrosion resistance of the coating internal to the border line by electrically isolating the coating internal to the border line. At least the at least one metal-inclusive layer is dissolved, by virtue of the laser-scribing, such that associated ablated material is (a) re-formed in a non-conductive manner, and/or (b) dissolved and/or diffused into the first substrate and/or at least one other layer of the multilayer thin film coating.

In certain example embodiments, an IG unit is provided. A first glass substrate supports a multilayer thin film coating, with the coating including at least one metal-inclusive layer and being susceptible to corrosion. A second glass substrate is substantially parallel to and spaced apart from the first glass substrate, with the coating being oriented between the first and second substrates. An edge seal is included. A laser-scribed border around a periphery of the coating is formed after the first and second substrates have been connected together. At least the at least one metal-inclusive layer of the coating proximate to the border is dissolved by virtue of the laser-scribing. Dissolved material from the coating, by virtue of the laser-scribing, is (a) incorporated into the first substrate and/or an underlayer of the coating, and/or (b) ablated and/or vaporized so as to re-form in a non-conductive manner. The border has a width and depth sufficient to electrically isolate an area internal to the border from an area external to the border to a level sufficient to at least retard electrochemical corrosion in the area internal to the border.

In addition to the features of the previous paragraph, in certain example embodiments, the glass substrates may be clear glass substrates, and/or the coating may be a low-E coating, e.g., including at least one layer comprising Ag.

In certain example embodiments, a kit for making an IG unit is provided. The kit includes a laser source and an intermediate product. The intermediate product includes first and second substantially parallel spaced apart glass substrates that are connected together with a peripheral edge spacer, a gap being defined between the first and second substrates, the first glass substrate having had a multilayer thin film coating formed thereon, the coating including at least one metal-inclusive layer and being susceptible to corrosion. The laser source is controllable to laser-scribe a line in the coating by exposing the intermediate product to a laser source in making the IG unit, the line creating a barrier to electron transport between opposing sides thereof.

In addition to the features of the previous paragraph, in certain example embodiments, the laser source may be portable.

In certain example embodiments, a method of making an IG unit is provided, with the method comprising: having an intermediate product, the intermediate product including first and second substantially parallel spaced apart glass substrates that are connected together with a peripheral edge spacer, a gap being defined between the first and second substrates, the first glass substrate having had a multilayer thin film coating formed thereon, the coating including at least one metal-inclusive layer; and coupling energy into the coating by exposing the intermediate product to a laser from a laser source operating at a wavelength at which the second glass substrate is substantially transmissive in making the IG unit, the energy being coupled into the coating and the laser source being controlled so as to selectively cause at least a part of the coating, in a desired pattern, to (a) dissolve into the first substrate and/or an underlayer of the coating, and/or (b) vaporize and re-form in a manner that does not conduct, the desired pattern defining at least first and second areas and being formed to a width and depth sufficient to electrically isolate the first and second areas from one another, the electrical isolation being at a level sufficient to at least substantially retard electrochemical corrosion in the first area.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of modifying an insulated glass window unit (IG unit), wherein:
    the IG unit includes first and second spaced apart glass substrates that are spaced apart from each other via at least a peripheral edge spacer, a gap being defined between the first and second glass substrates, the first glass substrate having thereon a multilayer coating, the multilayer coating including at least one metal-inclusive layer susceptible to corrosion,
    the multilayer coating comprises a bottom dielectric layer directly on the first glass substrate, the metal-inclusive layer being provided over at least the bottom dielectric layer on the first glass substrate, and
    wherein the method comprises:
    laser-scribing a line in the multilayer coating using a laser source, the line having a width sufficient to create at least a partial barrier to electron transport between first and second portions of the at least one metal-inclusive layer that are provided on opposing sides of the line to at least retard corrosion of the at least one metal-inclusive layer in the first portion, the first portion being closer than the second portion to a center of the at least one metal-inclusive layer; and
    performing the laser-scribing to dissolve a portion of the coating including the at least one metal-inclusive layer so that after said laser scribing the line is provided in the metal-inclusive layer but not through all of the bottom dielectric layer of the multilayer coating where the line is provided,
    wherein at least some dissolved material of the metal-inclusive layer from the laser-scribing is absorbed into an adjacent material.

2. The method of claim 1, wherein the laser source is 1064 nm laser source.

3. The method of claim 1, further comprising operating the laser source at a wavelength at which the second glass substrate is at least 90% transmissive.

4. The method of claim 1, wherein the coating is a low-emissivity coating and the metal-inclusive layer is a layer comprising Ag.

5. The method of claim 4, wherein the coating includes at least one layer comprising Ni, Cr, and/or Ti, the at least one layer comprising Ni, Cr, and/or Ti being formed on and in physical contact with the layer comprising Ag.

6. The method of claim 4, wherein the layer comprising Ag is sandwiched between and in direct physical contact with first and second layers comprising Ni, Cr, and/or Ti.

7. The method of claim 4, wherein the layer comprising Ag is formed on and in direct physical contact with a layer comprising zinc oxide.

8. The method of claim 1, further comprising performing the laser-scribing to dissolve only a part of the coating proximate to the line.

9. The method of claim 1, further comprising controlling heat generated by laser-scribing to avoid damaging the surface of the glass substrate on which the coating is formed.

10. The method of claim 9, further comprising interrupting the laser-scribing in order to assist in controlling the generated heat.

11. The method of claim 9, further comprising controlling the duty cycle and/or operating power of the laser source in order to assist in controlling the generated heat.

12. The method of claim 1, wherein the line is formed around a periphery of the IG unit, the barrier being defined around the periphery of the IG unit.

13. The method of claim 1, wherein the laser-scribing is practiced in connection with multiple overlapping scans of the laser source.

14. The method of claim 1, wherein the laser-scribing is performed to create a sub 10 pico-A electrical isolation barrier.

15. The method of claim 1, wherein the second substrate is oriented closer to the laser source than the first substrate during the laser-scribing.

16. The method of claim 1, wherein at least some other dissolved material of the metal-inclusive layer from the laser-scribing re-forms in a non-conductive manner.

17. The method of claim 1, further comprising providing an outer seal following the laser-scribing.

18. The method of claim 1, wherein the laser-scribing modifies sheet resistance of the multilayer coating proximate to the line.

19. The method of claim 1, wherein the line has a width of no more than 800 μm.

20. The method of claim 1, wherein the laser-scribing laser scribes no part of the bottom dielectric layer.

* * * * *